(12) United States Patent
Nagakura et al.

(10) Patent No.: US 12,392,301 B2
(45) Date of Patent: Aug. 19, 2025

(54) PISTON UNIT, TOP LAND MEMBER, AND COMBINATION OF PISTON UNIT PARTS

(71) Applicant: TPR Co., Ltd., Tokyo (JP)

(72) Inventors: Hiroyuki Nagakura, Tokyo (JP); Shuichi Inamori, Tokyo (JP); Kiyoyuki Kawai, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 18/851,051

(22) PCT Filed: Feb. 7, 2023

(86) PCT No.: PCT/JP2023/003944
§ 371 (c)(1),
(2) Date: Sep. 25, 2024

(87) PCT Pub. No.: WO2023/188834
PCT Pub. Date: Oct. 5, 2023

(65) Prior Publication Data
US 2025/0109722 A1 Apr. 3, 2025

(30) Foreign Application Priority Data
Mar. 28, 2022 (JP) ................ 2022-052199

(51) Int. Cl.
*F02F 5/00* (2006.01)
*F02F 3/00* (2006.01)
*F16J 9/12* (2006.01)

(52) U.S. Cl.
CPC ............. *F02F 5/00* (2013.01); *F02F 3/00* (2013.01); *F16J 9/12* (2013.01)

(58) Field of Classification Search
CPC . F16J 9/12; F16J 9/00; F02F 3/00; F02F 5/00
See application file for complete search history.

(56) References Cited

U.S. PATENT DOCUMENTS 1,933,943 A 11/1933 Towell
3,914,574 A * 10/1975 Hill ................ F02F 3/003
92/260

(Continued)

FOREIGN PATENT DOCUMENTS

JP S60-98748 U 7/1985
JP S61-47456 U 3/1986

(Continued)

OTHER PUBLICATIONS

Office Action in JP Application No. 2022-052199 dated Apr. 11, 2023, 8 pages.

(Continued)

*Primary Examiner* — Abiy Teka
(74) *Attorney, Agent, or Firm* — MARSHALL, GERSTEIN & BORUN LLP

(57) ABSTRACT

A piston unit adapted to reciprocate in a cylinder includes a piston and a top land member attached to the piston. The piston includes a first portion including a piston end at one end surface side and fitted with the top land member. The first portion has a smaller outer diameter than a second portion such that there is a step therebetween. The second portion is the other portion of the piston than the first portion. The top land member has a groove wall forming surface opposed to a step surface that connects the outer circumferential surface of the first portion and the outer circumferential surface of the second portion. The first ring groove is defined by the groove wall forming surface, the step surface, and the outer circumferential surface of the first portion.

7 Claims, 11 Drawing Sheets

(56) References Cited

U.S. PATENT DOCUMENTS

| | | | |
|---|---|---|---|
| 4,751,871 A | 6/1988 | Burghardt et al. | |
| 4,833,977 A | 5/1989 | Haahtela et al. | |
| 2010/0162987 A1* | 7/2010 | Ishida .................. | F16J 9/14 |
| | | | 123/193.6 |
| 2014/0076265 A1* | 3/2014 | Mittler .................. | F02F 5/00 |
| | | | 123/193.6 |
| 2021/0164568 A1* | 6/2021 | Nango .................. | F16J 9/206 |

FOREIGN PATENT DOCUMENTS

| | | |
|---|---|---|
| JP | S61-053543 U | 4/1986 |
| JP | S61-232366 A | 10/1986 |
| JP | S63-230947 A | 9/1988 |
| JP | H02-80750 U | 6/1990 |
| JP | 2020-049536 A | 4/2020 |
| KR | 102153963 B1 | 9/2020 |
| WO | WO-2019203358 A1 * | 10/2019 |

OTHER PUBLICATIONS

Search Report in International Application No. PCT/JP2023/003944 dated Apr. 18, 2023, 2 pages.
Written Opinion in JP Application No. 2022-052199 dated Apr. 11, 2023, 6 pages.
Written Amendment in JP Application No. 2022-052199 dated Jun. 9, 2023, 7 pages.
Decision to Grant a Patent in JP Application No. 2022-052199 dated Jun. 19, 2023, 4 pages.
Extended European Search Report in EP Application No. 23778870.8 dated Mar. 26, 2025, 10 pages.

* cited by examiner

Fig. 3
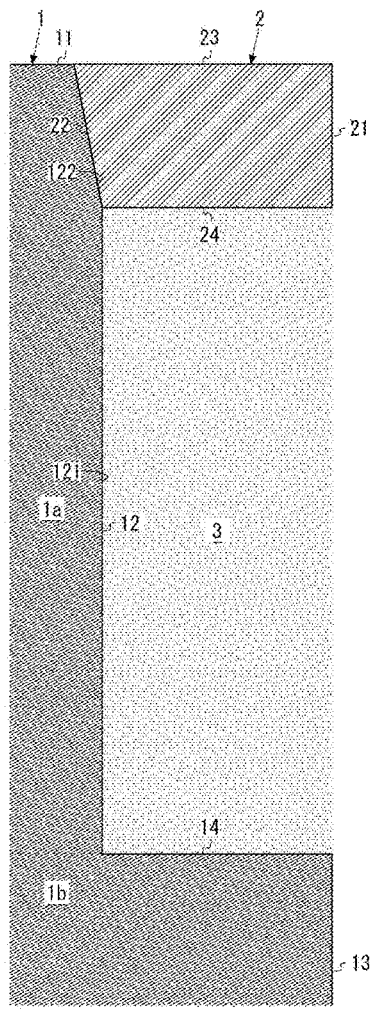
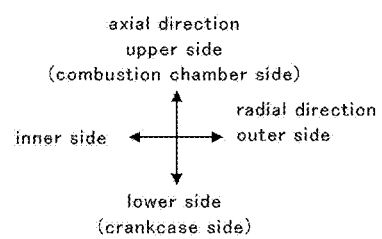

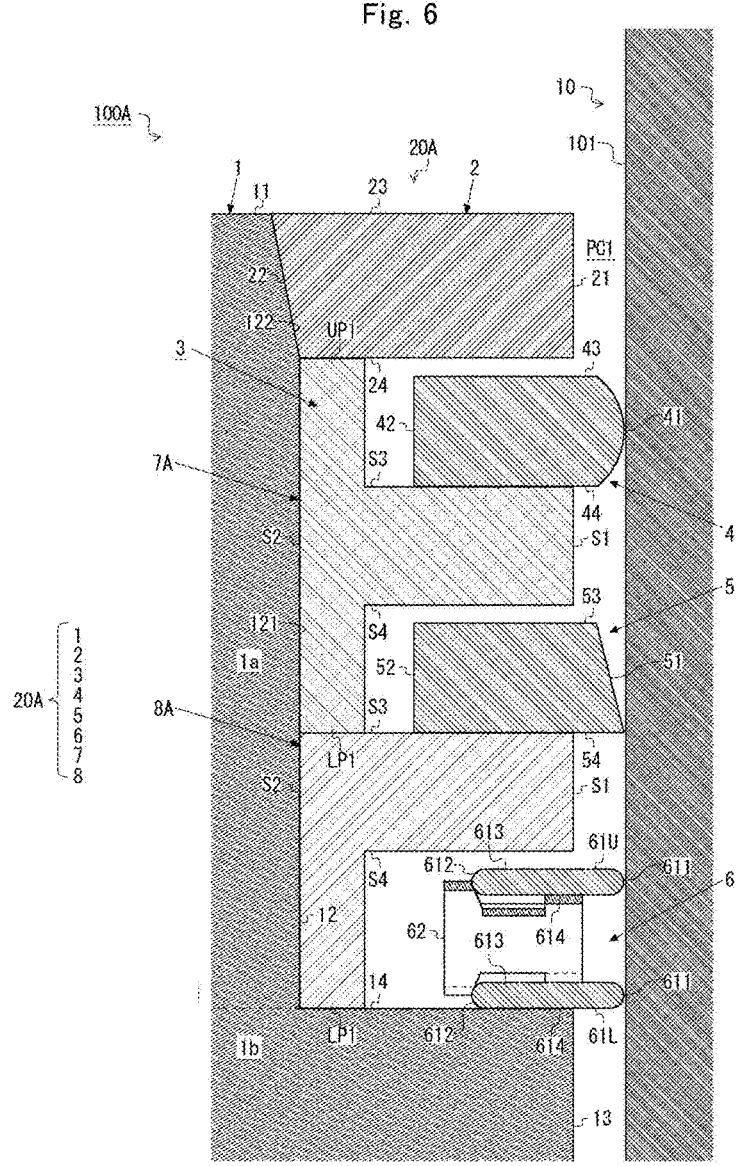

Fig. 7
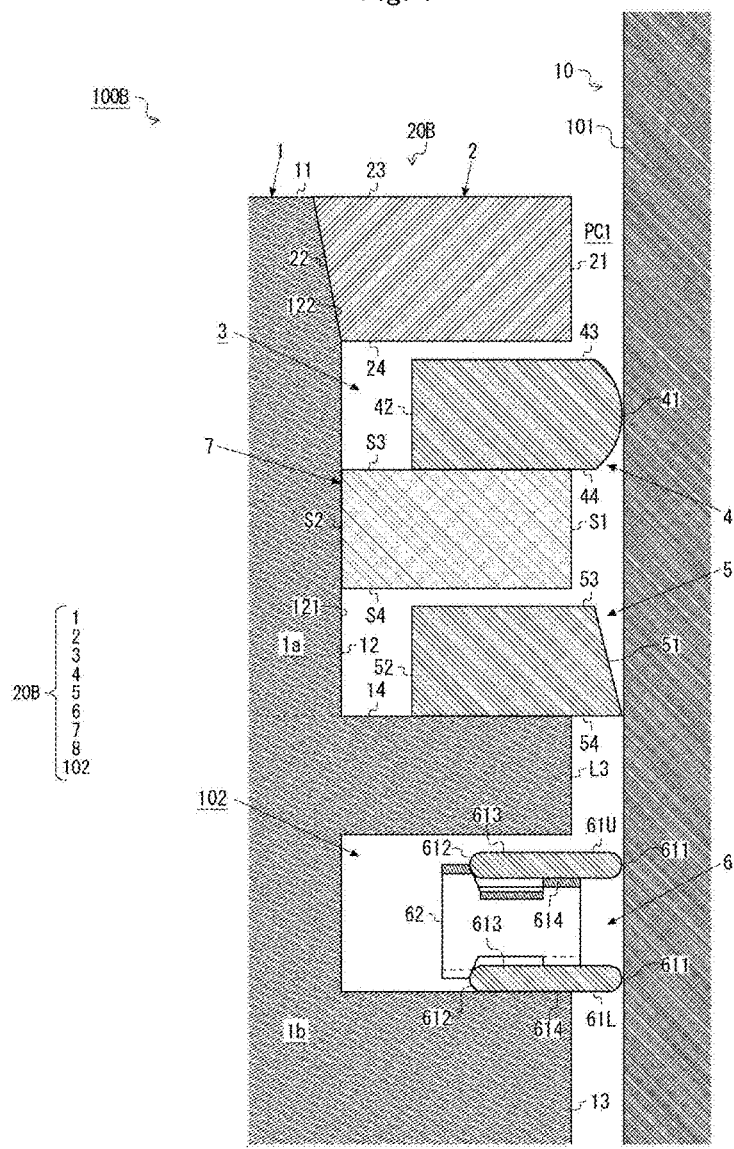
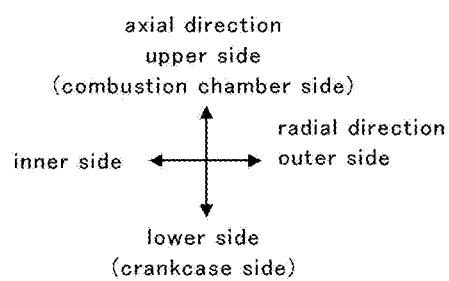

PISTON UNIT, TOP LAND MEMBER, AND COMBINATION OF PISTON UNIT PARTS

TECHNICAL FIELD

The present invention relates to a piston unit, a top land member, and a combination of parts for a piston unit.

BACKGROUND ART

Reciprocating engines and pneumatic equipment are known examples of mechanisms including a cylinder and a piston reciprocating therein. The internal combustion engine is an example of the reciprocating engine. To ensure sealing performance and to reduce friction, the internal combustion engine uses one or more piston rings that are fitted in one or more ring grooves provided on the outer circumferential surface of the piston to slide on the inner surface of the cylinder.

Typical internal combustion engines, such as gasoline engines, use a combination of piston rings including a compression ring and an oil control ring. In their positional relationship along the axial direction of the piston, the compression ring is disposed closer to the combustion chamber, and the oil control ring is disposed closer to the crankcase. These piston rings slide on the inner surface of the cylinder to exercise their functions. The oil control ring, which is farthest from the combustion chamber, has the function of sealing against oil by scraping off excess engine oil (lubrication oil) adhering to the inner surface of the cylinder toward the crank, thereby preventing oil leakage into the combustion chamber (or oil rising), and the function of controlling the quantity of oil so as to adequately maintain a lubrication oil film on the inner wall surface of the cylinder, thereby preventing seizing of the piston during the operation of the internal combustion engine. The compression ring has the function of sealing against gases by maintaining the airtightness, thereby preventing leakage of the burned gas from the combustion chamber to the crankcase (or blow-by), and the function of sealing against oil by scraping off excess oil that has escaped from the scraping by the oil control ring, thereby preventing the oil rising.

CITATION LIST

Patent Literature

[Patent Literature 1] Japanese Patent application Laid-Open No. S61-232366
[Patent Literature 2] Japanese Utility Model Application Laid-Open No. S61-047456
[Patent Literature 3] Japanese Patent application Laid-Open No. 2020-049536
[Patent Literature 4] Japanese Utility Model Application Laid-Open No. S60-098748

SUMMARY OF INVENTION

Technical Problem

Conventional piston has a portion (called "top land") having an outer diameter larger than the inner diameter of the piston rings between the top surface of the piston and the ring groove closest to the top surface. Therefore, when fitting a piston ring into the ring groove, it is necessary to expand the gap of the piston ring so as to make the inner diameter of the piston ring larger than the outer diameter of the top land. In this process, excessively expanding the gap can result in deformation or breakage of the piston ring due to stress. Moreover, the presence of the top land in conventional piston makes it impossible to attach gapless piston rings to them.

The present invention has been made to address the above problem, and its object is to provide the technology that allows easy assembly of piston rings in a piston unit that is adapted to reciprocate in a cylinder.

Solution to Problem

To solve the above problem, the present invention adopts the following features. According to the present invention, there is provided a piston unit adapted to reciprocate in a cylinder, comprising, a piston, a top land member attached to the piston, one or more ring grooves formed on the outer circumference of the piston, and one or more piston rings fitted in a first ring groove closest to one end surface of the piston among the one or more ring grooves to slide on the inner wall surface of the cylinder. The piston includes a first portion including the piston end at the one end surface side and fitted with the top land member. The first portion has a smaller outer diameter than a second portion such that there is a step therebetween, the second portion being the other portion of the piston than the first portion. The top land member has a groove wall forming surface opposed to a step surface that connects the outer circumferential surface of the first portion and the outer circumferential surface of the second portion, and the first ring groove is defined by the groove wall forming surface, the step surface, and the outer circumferential surface of the first portion.

As above, the top land, which is the portion between one end surface of the piston and the first ring groove, of the piston unit according to the present invention is constituted by the top land member separate from the piston. Therefore, piston rings can be assembled to the piston to which the top land member is not attached. This eliminates the need to expand the piston rings so as to make the inner diameter of the piston rings larger than the outer diameter of the top land when attaching the piston rings to the piston. Therefore, even piston rings without gaps can easily be attached to the piston. In the case of a piston ring having a gap, the piston unit according to the present invention eliminates the need to expand the gap to make the inner diameter of the piston ring larger than the outer diameter of the top land, and therefore deformation or breakage of the ring due to excessive expansion of the gap can be prevented. Therefore, the piston unit according to the present invention allows easy assembly of the piston rings.

The piston unit according to the present invention may further include one or more partition rings fitted in the first ring groove side by side with the one or more piston rings along the axial direction of the piston, and the one or more partition rings may be fitted to the outer circumferential surface of the first portion with a predetermined spacing to the inner wall of the cylinder.

According to the present invention, at least one partition ring among the one or more partition rings may be a partition ring having no gap.

According to the present invention, a plurality of piston rings may be fitted in the first ring groove, and the partition ring may be disposed between the piston ring closest to the one end surface of the piston and the piston ring second closest to the one end surface of the piston among the plurality of piston rings.

According to the present invention, the top land member is formed as a ring that has an annular piston-fit surface fitted to the outer circumferential surface of the first portion as the inner circumferential surface.

According to the present invention, the top land member may have an annular portion that has an annular piston-fit surface fitted to the outer circumferential surface of the first portion as the inner circumferential surface and a lid portion provided inside the annular portion to abut the one end surface of the piston.

The piston unit according to the present invention may be designed to be mounted in a cylinder of an internal combustion engine.

The present invention can be identified as a top land member attached to a piston adapted to reciprocate in a cylinder. According to the present invention, the piston has one or more ring grooves formed on its outer circumference. The piston includes a first portion including the piston end at one end surface side and fitted with the top land member. The first portion has a smaller outer diameter than a second portion such that there is a step therebetween, the second portion being the other portion of the piston than the first portion. The first ring groove closest to the one end surface among the one or more ring grooves is fitted with one or more piston rings adapted to slide on the inner wall surface of the cylinder arranged side by side along the axial direction of the piston. The top land member according to the present invention has a groove wall forming surface opposed to a step surface that connects the outer circumferential surface of the first portion and the outer circumferential surface of the second portion, and the first ring groove may be defined by the groove wall forming surface, the step surface, and the outer circumferential surface of the first portion.

The present invention can be identified as a combination of parts for the above-described piston unit. In other words, the present invention can be identified as a top land member attached to a piston adapted to reciprocate in a cylinder. The combination of parts for a piston unit may include a top land member fitted to a piston adapted to reciprocate in a cylinder, and one or more piston rings adapted to slide on the inner wall surface of the cylinder. The one or more piston rings are fitted in a first ring groove located closest to one end surface of the piston among one or more ring grooves formed on the outer circumference of the piston. The piston has a first portion including the piston end at the one end surface side and fitted with the top land member. The first portion has a smaller outer diameter than a second portion such that there is a step therebetween, the second portion being the other portion of the piston than the first portion. The top land member has a groove wall forming surface opposed to a step surface that connects the outer circumferential surface of the first portion and the outer circumferential surface of the second portion, and the first ring groove is defined by the groove wall forming surface, the step surface, and the outer circumferential surface of the first portion.

Advantageous Effects of the Invention

According to the present invention, it is possible to easily assemble a piston ring in a piston unit adapted to reciprocate in a cylinder.

BRIEF DESCRIPTION OF DRAWINGS

FIG. 3 is a cross sectional view illustrating a first ring groove according to the embodiment.

FIG. 6 is a partial cross sectional view illustrating an internal combustion engine including a piston unit according to a first modification of the embodiment.

FIG. 7 is a partial cross sectional view illustrating an internal combustion engine including a piston unit according to a second modification of the embodiment.

MODE FOR CARRYING OUT THE INVENTION

In the following, a preferred embodiment of the present invention will be described. What is descried in the following as the embodiment is a case where the technology according to the present invention is applied to an internal combustion engine as an example of the reciprocating engine. It should be understood, however, that the technology according to the present invention can be applied to any mechanism, not limited to the internal combustion engine, that has a piston reciprocating in a cylinder. For example, the technology according to the present invention can be applied to reciprocating engines, such as internal combustion engines, and pneumatic equipment, such as compressors. The structures and features described in the following description of the embodiment are not intended to limit the technical scope of the present invention only to them, unless otherwise stated.

Overall Structure

Figure 1:
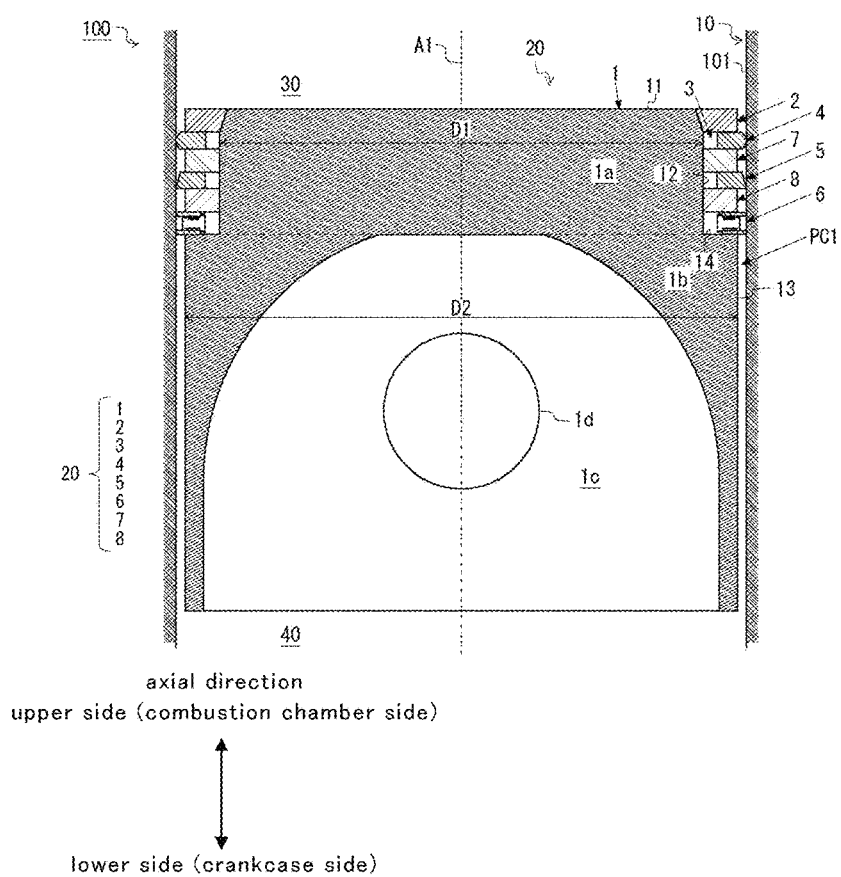
FIG. 1 is a cross sectional view of an internal combustion engine including a piston unit according to an embodiment.
Figure 2:
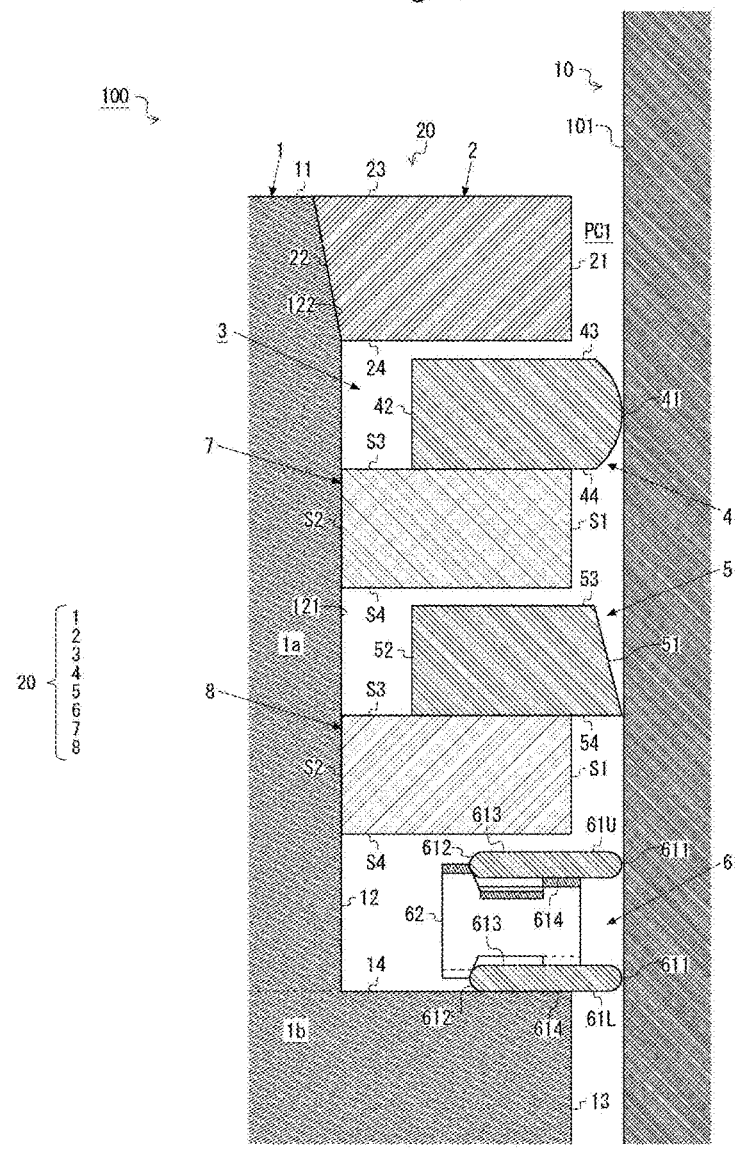
FIG. 2 is a partial cross sectional view of the internal combustion engine according to the embodiment.

FIG. 1 is a cross sectional view of an internal combustion engine 100 including a piston unit 20 according to the embodiment. FIG. 2 is a partial cross sectional view of the internal combustion engine 100 including the piston unit 20 according to the embodiment. FIGS. 1 and 2 show cross sections taken along the center axis A1 of the piston 1. As illustrated in FIGS. 1 and 2, the internal combustion engine 100 according to the embodiment includes a cylinder 10 and the piston unit 20 mounted in the cylinder 10. The internal combustion engine 100 is designed in such a way that the piston unit 20 reciprocates in the cylinder 10. In the following description of the internal combustion engine, the side facing the combustion chamber indicated by reference numeral "30" will be referred to as the upper side, and the side facing the crankcase indicated by the reference numeral "40" will be referred as the lower side.

As illustrated in FIGS. 1 and 2, the piston unit 20 includes a piston 1, a top land member 2 attached to the piston 1, a first ring groove 3 provided on the outer circumference of the piston 1, a plurality of piston rings 4, 5, 6 fitted in the first ring groove 3, and a plurality of partition rings 7, 8 fitted in the first ring groove 3 side by side with the piston rings 4, 5, 6 along the axial direction of the piston 1. The top land member 2, the piston rings 4, 5, 6, and the partition rings 7, 8 can be regarded as parts for the piston unit. The first ring groove 3 is formed on the outer circumference of the piston 1 as a space delimited by a groove wall forming surface 24 of the top land member 2, a step surface 14 of the piston 1, and a first outer circumferential surface 12 of the piston 1 (see FIG. 3). The first ring groove 3 will be described in further detail later. The piston unit 20 according to the embodiment is designed to use a combination of three piston rings including two compression rings including a top ring 4 and a second ring 5 and one oil control ring 6 that are fitted in the first ring groove 3.

In this specification, the top ring 4, the second ring 5, and the oil control ring 6 will also be referred to simply as the "piston rings" when describing them without distinguishing between them. The state in which the piston 1 with the piston rings and the partition rings assembled thereto (to constitute the piston unit 20) is mounted (or inserted) in the cylinder 10 as illustrated in FIGS. 1 and 2 will be referred to as "the state in use". As illustrated in FIG. 2, the direction along the center axis of the piston 1 (i.e. the axial direction) is defined as the up-and-down direction. Along the axial direction of the piston 1, the side facing the combustion chamber 30 of the internal combustion engine 100 (i.e. the upper side in FIG. 1) is defined as the upper side, and the opposite side or the side facing the crankcase 40 (i.e. the lower side in FIG. 1) is defined as the lower side. In the following, the parts of the piston unit 20 will be described.

Piston

As illustrated in FIG. 1, the piston 1 has a generally stepped cylindrical outer shape. The piston 1 has the center axis A1. Among the two axial end surfaces of the piston 1, the end surface on the combustion chamber 30 side (i.e. the upper surface) constitutes the top surface 11 of the piston 1. The top surface 11 is a flat surface that is perpendicular to the axial direction of the piston 1 and facing the combustion chamber 30. The top surface 11 corresponds to the "one end surface of the piston" according to the present invention. However, the "one end surface of the piston" according to the present invention is not limited to the top surface, but it may be either one of the two axial end surfaces of the piston. The piston 1 has a hollow part 1c that opens at the lower end surface of the piston 1 and a pin hole 1d that extends through the piston 1 from the hollow part 1c to the exterior of the piston 1. A piston pin (not shown) is inserted through the pin hole 1d. The piston 1 is linked with a crankshaft via the piston pin. In the present invention, the mechanism used to transmit the power of the piston is not limited. For example, it may be a mechanism that converts reciprocating motion of the piston into rotary motion by a piston and crank mechanism (slider-crank mechanism) or a scotch yoke mechanism, or a free crank mechanism that does not have a connection rod or a crank.

As illustrated in FIG. 1, the piston 1 is sectioned into a first portion 1a and a second portion 1b along the axial direction. The first portion 1a is a cylindrical portion including the upper end of the piston 1 (or the end at the top surface 11 side) and extends a certain length. The second portion 1b is the other portion of the piston 1 than the first portion 1a, which has a cylindrical shape and extends below the first portion 1a. The outer circumferential surface of the first portion 1a is referred to as the first outer circumferential surface and indicated by reference numeral "12" in the drawings. The outer circumferential surface of the second portion 1b is referred to as the second outer circumferential surface and indicated by reference numeral "13" in the drawings. The outer diameter of the first portion 1a (namely, the largest diameter of the first outer circumferential surface 12) is D1, and the outer diameter of the second portion 1b (namely, the largest diameter of the second outer circumferential surface 13) is D2. In this design of the piston 1, D1<D2. In other words, the outer diameter of the first portion 1a is smaller than the outer diameter of the second portion 1b. Therefore, there is a radial step between the first outer circumferential surface 12 and the second outer circumferential surface 13. The first outer circumferential surface 12 is located radially inside the second outer circumferential surface 13. The first outer circumferential surface 12 and the second outer circumferential surface 13 are connected by the step surface 14. While the step surface 14 in this embodiment is designed as a flat surface that is perpendicular to the axial direction of the piston 1, the step surface according to the present invention is not limited to this design. The portion (corner) that connects the first outer circumferential surface 12 and the step surface 14 may be shaped like a curved surface or a chamfered surface.

As illustrated in FIG. 2, the first outer circumferential surface 12 includes a constant diameter surface 121 and a tapered surface 122. The constant diameter surface 121 is connected to the inner circumferential edge of the step surface 14 and extends upward from the inner circumferential edge of the step surface 14 along the axial direction of the piston 1. The tapered surface 122 connects the upper end of the constant diameter surface 121 and the outer circumferential edge of the top surface 11 of the piston 1. The tapered surface 122 is beveled in such a way that its diameter decreases (or it becomes closer to the center axis A) as it extends toward the top surface 11. The second outer circumferential surface 13 is connected to the outer circumferential edge of the step surface 14 and extends downward along the axial direction of the piston 1. In this internal combustion engine 100, a gap of a predetermined distance is left between the second outer circumferential surface 13 of the piston 1 and the inner wall surface 101 of the cylinder 10 to provide a piston clearance PC1.

Top Land Member

The top land member 2 is a member that is attached to the first portion 1a of the piston 1 to function as a substitute for the top land. The top land member 2 according to the embodiment is shaped like a ring. However, the shape of the top land member according to the present invention is not limited to a ring (or annular) shape. The top land member 2 according to the embodiment is continuous around the entire circumference without a gap. The top land member 2 has a land outer circumferential surface 21, a piston-fit surface 22, a land end surface 23, and a groove wall forming surface 24.

The land end surface 23 is the upper end surface of the top land member 2 and faces the combustion chamber 30. The land end surface 23 of the top land member 2 and the top surface 11 of the piston 1 constitute the top surface (or the upper end surface) of the piston unit 20. While the land end surface 23 according to the embodiment is a flat surface that is perpendicular to the axial direction of the piston 1, the present invention is not limited by this.

The groove wall forming surface 24 is the lower end surface of the top land member 2 and faces the crankcase 40. As illustrated in FIG. 2, the groove wall forming surface 24 is opposed to the step surface 14 of the piston 1 with a distance therebetween. While the groove wall forming surface 24 is designed to be parallel to the step surface 14, the present invention is not limited by this. The groove wall forming surface 24 may be slanted relative to the step surface 14.

The piston-fit surface 22 is an annular surface that constitutes the inner circumferential surface of the top land member 2. The piston-fit surface 22 is fitted to the tapered surface of the first outer circumferential surface 12 of the first portion 1a, whereby the top land member 2 is fixed to the first portion 1a of the piston 1. The piston-fit surface 22 of the top land member 2 is in intimate contact with the first outer circumferential surface 12 of the piston 1. The piston-fit surface 22 is in contact with the first outer circumferential surface 12 around the entire circumference. Examples of the mode of attaching the top land member 2 to the piston include, but are not limited to, shrink fitting, friction bonding, using screws, screwing, adhesion, and welding.

To match with the shape of the tapered surface 122, the piston-fit surface 22 is slanted in such a way that its diameter decreases as it extends upward. The piston-fit surface 22 and the tapered surface 122 are fitted together, so that the top land member 2 is supported by the tapered surface 122 from below. This restricts the movement of the top land member 2 in the direction away from the top surface 11 (i.e. downward direction), so that a predetermined spacing between the groove wall forming surface 24 and the step surface 14 is kept.

Figure 4A:
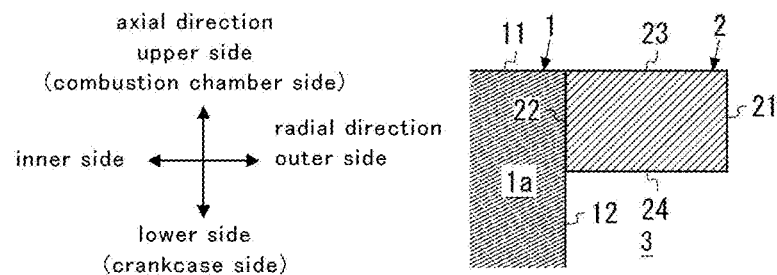
FIGS. 4A-4D are diagrams for illustrating variations of the mode of fitting between a top land member and a piston.
Figure 4B:
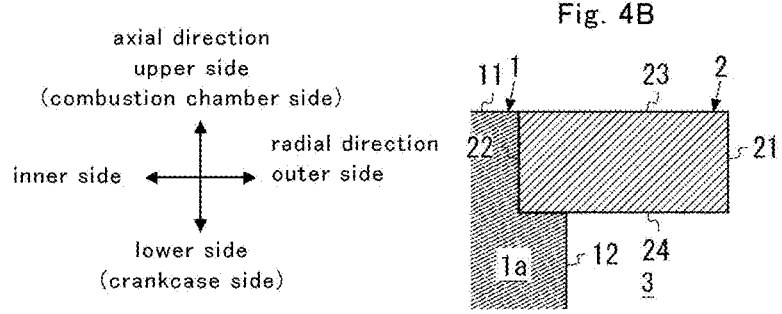
Figure 4C:
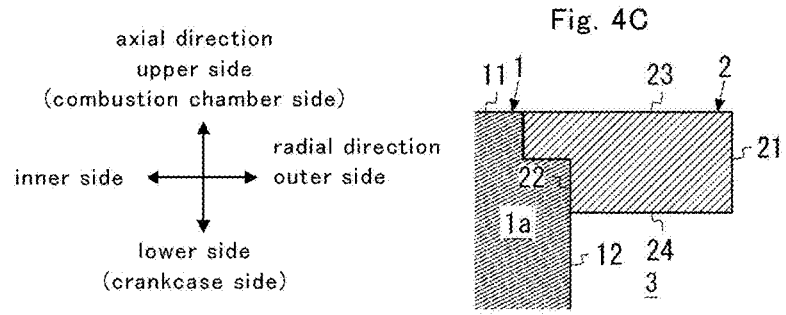
Figure 4D:
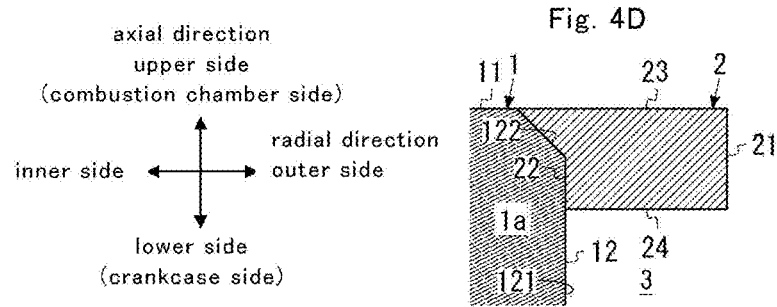

FIGS. 4A-4D are diagrams for illustrating variations of the mode of fitting between the top land member 2 and the piston 1. As illustrated in FIG. 4A, the first outer circumferential surface 12 of the piston 1 and the piston-fit surface 22 of the top land member 2 may be surfaces extending along the axial direction. As illustrated in FIG. 4B, the first portion 1a may be provided with a radial step that can receive the top land member 2 to restrict the downward movement of the top land member 2. As illustrated in FIG. 4C, a portion of the inner circumferential surface of the top land member 2 may be expanded radially inward, and the first portion 1a may be provided with a radial step that can receive this portion of the top land member 2 to restrict the downward movement of the top land member 2. As illustrated in FIG. 4D, the piston-fit surface 22 of the top land member 2 may be partly slanted so that a portion of the piston-fit surface 22 is fitted to the constant diameter surface 121 and the other portion is fitted to the tapered surface 122.

The land outer circumferential surface 21 constitutes the outer circumferential surface of the top land member 2. The land outer circumferential surface 21 constitutes a part of the outer circumferential surface of the piston unit 20. More specifically, the land outer circumferential surface 21 serves as the outer circumferential surface of the top land. The outer diameter of the top land member 2 (namely, the largest diameter of the land outer circumferential surface 21) is designed to be smaller than the inner diameter of the inner wall surface 101 of the cylinder 10. Therefore, a predetermined spacing is left between the land outer circumferential surface 21 of the top land member 2 and the inner wall surface 101 of the cylinder 10. In other words, the top land member 2 is spaced from the inner wall surface 101 of the cylinder 10. The outer diameter of the top land member 2 is designed to be larger than the inner dimeter of the piston rings 4, 5, 6.

As illustrated in FIG. 2, the top land member 2 is attached to the first portion 1a in such a way that a predetermined distance between the groove wall forming surface 24 and the step surface 14 is kept along the axial direction of the piston 1. Thus, the first ring groove 3 in which the piston rings and the partition rings can be fitted is formed on the outer circumference of the piston 1. FIG. 3 is a cross sectional view illustrating the first ring groove 3 according to the embodiment. In FIG. 3, the first ring groove 3 is the dot-hatched area. As illustrated in FIG. 3, the first ring groove 3 is defined by the groove wall forming surface 24 of the top land member 2, the step surface 14 of the piston 1, and the first outer circumferential surface 12 (more specifically, the constant diameter surface 121) of the piston member 1. The groove wall forming surface 24 serves as the upper inner wall of the first ring groove 3, the step surface 14 serves as the lower inner wall of the first ring groove 3, and the constant diameter surface 121 of the first outer circumferential surface 12 serves as the bottom wall of the first ring groove 3. The first ring groove 3 configured as above is a groove having a rectangular cross sectional shape that extends annularly about the axis of the piston 1 around the entire circumference of the piston 1. Since the piston-fit surface 22 is in contact with the first outer circumferential surface 12 around the entire circumference, the oil in the first ring groove 3 is prevented from leaking between the piston 1 and the top land member 2.

The material of the top land member 2 is not limited. For example, a steel, a cast iron, a copper alloy, or an aluminum alloy may be used. For example, a material having a coefficient of linear expansion that is different from the material of the piston 1 may be used for the top land member 2.

The surface of the top land member 2 may have a coating applied thereon that includes at least one of a resin coating layer, a nitrided coating layer, an anodic oxidation coating layer, a plated coating layer, a PVD coating layer, a paint coating layer, and a DLC coating layer. The resin coating refers to a coating made of a resin material. The nitrided coating refers to a coating that is produced by infiltrating nitride into a metal surface by nitriding. The plated coating refers to a coating produced by plating. Examples of the plated coating include an Ni—P plated coating and a chromium plated coating. The Ni—P plated coating refers to a coating produced by Ni—P plating. For example, the method of Ni—P plating may be electroless Ni—P plating, though the method is not limited to this. The chromium plated coating refers to a coating produced by chromium plating. Chromium plating is also called industrial chromium plating. The PVD (Physical Vapor Deposition) coating refers to a coating produced by PVD. The DLC (Diamond Like Carbon) coating refers to an amorphous hard carbon film that is made mainly of hydrocarbons and carbon isotopes. It is preferred that such a coating be applied to the piston-fit surface 22 and the groove wall forming surface 24, which are the surfaces of the top land member 2 that are to be in contact with other parts. Applying such a coating can enhance the abrasion resistance of the top land member 2, thereby preventing problems that might otherwise be caused by direct contact of their base members, such as adhesion of the top land member 2 and other members.

The land end surface 23 and the land outer circumferential surface 21 of the top land member 2, which face the combustion chamber 30, may be provided with a heat insulation layer. The heat insulation layer is made of a material that can make the heat transfer between the combustion chamber 30 and the top land member 2 lower than that without the heat insulation layer. For example, the heat insulation layer may be a flame spray coating layer of a ceramic material (e.g. alumina or zirconia). Providing the heat insulation layer on the land end surface 23 of the top land member 2 can reduce rises in the temperature of the piston 1.

Piston Ring

The piston rings 4, 5, 6 are sliding members that are attached to the piston 1 mounted in the cylinder 10 of the internal combustion engine 100 to slide on the inner wall surface 101 of the cylinder 10 with the reciprocating motion of the piston 1. The three piston rings 4, 5, 6 are fitted in one first ring groove 3 in the piston unit 20 according to the embodiment.

As illustrated in FIG. 2, the top ring 4 is the compression ring that is set at the position closest to the top surface 11 of the piston 1 (i.e. the uppermost position) among the three piston rings. The top ring 4 used in this embodiment is designed to have a rectangular shape, in other words, its cross sectional shape is rectangular. The top ring 4 has an outer circumferential surface 41, an inner circumferential surface 42, a top surface 43, and a bottom surface 44. The top surface 43 and the bottom surface 44 define the axial width of the top ring 4. The outer circumferential surface 41 is shaped like a barrel surface that is curved in such a way as to bulge radially outward. The top ring 4 is assembled to the piston 1 in such a way that the top surface 43, which is one of the two axial end surfaces of the top ring 4, faces upward, the bottom surface 44, which is the other axial end surface, faces downward, and the outer circumferential surface 41 is in sliding contact with the inner wall surface 101 of the cylinder 10 in the internal combustion engine 100. The top ring 4 has a self-tension so that the outer circumferential surface 41 presses the inner wall surface 101 of the cylinder 10 in the state in use. Thus, the top ring 4 has the function of sealing against gases and oil. The shape of the top ring according to the present invention is not limited to the shape described above. A variety of shapes can be adopted for the top ring. For example, the outer circumference of the top ring may be straight faced or taper faced. The top ring may be designed to have a keystone shaped cross section, a half-keystone shaped cross section, or an internally beveled cross section.

As illustrated in FIG. 2, the second ring 5 is the compression ring that is set at the position second closest to the top surface 11 of the piston 1 among the three piston rings. In other words, the second ring 5 is set between the top ring 4 and the oil control ring 6. The second ring 5 has an outer circumferential surface 51, an inner circumferential surface 52, a top surface 53, and bottom surface 54. The top surface 53 and the bottom surface 54 define the axial width of the second ring 5. The second ring 5 has a rectangular shape, and the outer circumferential surface 51 of the second ring 5 has a tapered shape so that its diameter increases as it extends downward. The second ring 5 is assembled to the piston 1 in such a way that the top surface 53, which is one of the two axial end surfaces of the second ring 5, faces upward, the bottom surface 54, which is the other axial end surface, faces downward, and the outer circumferential surface 51 is in sliding contact with the inner wall surface 101 of the cylinder 10 in the internal combustion engine 100. The second ring 5 has a self-tension so that the outer circumferential surface 51 presses the inner wall surface 101 of the cylinder 10 in the state in use. Thus, the second ring 5 has the function of sealing against gases and oil. The shape of the second ring according to the present invention is not limited to the shape described above. A variety of shapes can be adopted for the second ring. For example, the outer circumferential surface of the second ring may be barrel faced or straight faced. The second ring may be a scraper ring having an undercut or a napier ring. The second ring may be designed to have a keystone shaped cross section, a half-keystone shaped cross section, or an internally beveled cross section.

As illustrated in FIG. 2, the oil control ring 6 is the piston ring that is set at the position farthest from the top surface 11 of the piston 1 (i.e. the lowermost position) among the three piston rings. As illustrated in FIG. 2, the oil control ring 6 is what is called a three-piece combined ring, which includes a pair of segments 61U, 61L (an example of a pair of sliding parts) and a spacer-expander 62 (an example of an expander).

The two segments 61U, 61L are annular around the axis of the oil control ring 6. The two segments 61U, 61L are provided independently from each other and juxtaposed along the axial direction. The upper segment 61U is disposed on the upper side (or the top) of the spacer-expander 62, and the lower segment 61L is disposed on the lower side (or the bottom) of the spacer-expander 62. The two segments 61U, 61L used in the oil control ring 6 described here have the same shape. However, according to the present invention, the two segments may have different shapes. In the following, the two segments 61U, 61L will also be simply referred to as the segment or segments 61 when describing them without distinguishing them. As illustrated in FIG. 2, the segment 61 has an outer circumferential surface 611, an inner circumferential surface 612, a top surface 613, and a bottom surface 614. The top surface 613 and the bottom surface 614 define the axial width of the segment 61. Each segment 61 is assembled to the piston 1 in such a way that the top surface 613, which is one of the two axial end surfaces of the segment 61, faces upward, the bottom surface 614, which is the other axial end surface, faces downward, and the outer circumferential surface 611 is in sliding contact with the inner wall surface 101 of the cylinder 10 in the internal combustion engine 100. The spacer-expander 62 is set between the two segments 61U, 61L. The spacer-expander 62 has a self-tension so that its diameter expands in the state in use. In consequence, the upper segment 61U and the lower segment 61L are biased radially outward by the spacer-expander 62, so that the outer circumferential walls 611 of them press the inner wall surface 101 of the cylinder 10. Thus, the function of sealing against oil is achieved. The shape of the oil control ring according to the present invention is not limited to the shape described above. For example, the oil control ring may be what is called a two piece oil control ring, which has an oil control ring body that is annular about its axis and provided with a pair of rails (an example of the pair of sliding parts) that extend radially outward and are juxtaposed along the axial direction, and a coil expander (an example of the expander) that biases the oil control ring body radially outward. The oil control ring may be designed to function as a single piece without a spacer-expander or a coil expander.

Partition Ring

The partition rings 7, 8 are ring-shaped members that are fitted in the first ring groove 3 side by side with one or more piston rings (in the case described herein, the three piston rings 4, 5, 6) along the axial direction of the piston 1 to function as substitutes for piston lands. The partition rings 7, 8 used in this embodiment are each designed to have a rectangular shape, in other words, their cross sectional shape in the cross section perpendicular to the circumferential direction is rectangular. However, the present invention is not limited to this.

As illustrated in FIG. 2, the first ring groove 3 of the piston unit 20 is partitioned by the partition ring 7 disposed between the top ring 4 and the second ring 5, and the partition ring 8 disposed between the second ring 5 and the oil control ring 6.

As illustrated in FIG. 2, each of the partition rings 7, 8 has an outer circumferential spacing surface S1, an inner circumferential fitting surface S2, an upper partition wall surface S3, and a lower partition wall surface S4. In the state in use, the upper partition wall surface S3 faces toward the combustion chamber 30, and the lower partition wall surface S4 faces toward the crankcase 40. The inner circumferential fitting surface S2 is provided on the inner circumference of the partition rings 7, 8. In the state in use, the inner fitting surface S2 is fitted to the constant diameter surface 121 of the first circumferential surface 12 in the first portion 1a to stay in contact with the first outer circumferential surface 12. In this embodiment, the inner circumferential fitting surface S2 is in contact with the first outer circumferential surface 12 around the entire circumference. However, the present invention is not limited to this, just a portion of the inner circumferential fitting surface in contact with the outer circumferential surface of the first portion is sufficient. In this embodiment, the inner circumferential fitting surface S2 is fitted to the first outer circumferential surface 12 in such a way that the partition ring 7, 8 can slide on the first outer circumferential surface 12 along the axial direction. Therefore, the partition rings 7, 8 can be displaced along the axial direction together with the piston rings 4, 5, 6. Nevertheless, the present invention is not limited to this. The inner circumferential fitting surface may be fitted to the outer circumferential surface of the first portion in such a way that the partition rings cannot be displaced along the axial direction. The outer circumferential spacing surface S1 is provided on the outer circumference of the partition rings 7, 8 to connect the outer circumferential edge of the upper partition wall surface S3 and the outer circumferential edge of the lower partition wall surface S4. In the state in use, the outer circumferential spacing surface S1 leaves a predetermined spacing distance to the inner wall surface 101 of the cylinder 10. Therefore, the partition rings 7, 8 are spaced apart from the inner wall surface 101 of the cylinder 10.

The upper partition wall surfaces S3 of the partition rings 7, 8 may be either parallel to or slanted relative to the groove wall forming surface 24 of the top land member 2. Likewise, the lower partition wall surfaces S4 of the partition rings 7, 8 may be either parallel to or slanted relative to the step surface 14 of the piston 1. The edges of the partition rings 7, 8 may be provided with chamfers or step-cuts.

Figure 5A:
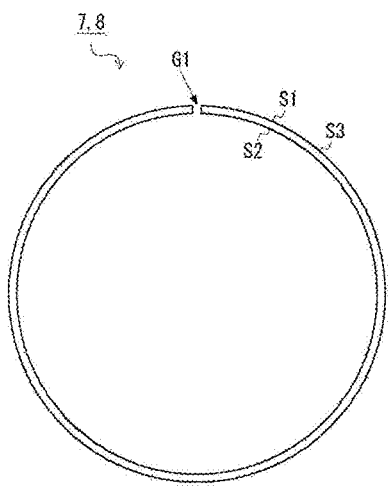
FIGS. 5A and 5B are diagrams schematically illustrating shapes of partition rings according to the embodiment.
Figure 5B:
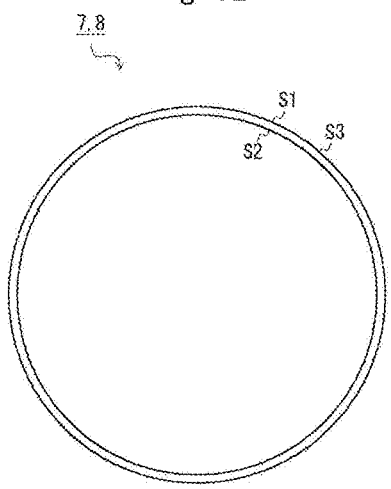

The partition rings 7, 8 may or may not have a gap in them. FIGS. 5A and 5B are top views (seen from above along the axial direction) that schematically illustrates shapes of the partition rings 7, 8 according to the embodiment. As illustrated in FIG. 5A, the partition rings 7, 8 may have a gap indicated by reference sign "G1". The gap G1 is formed between a pair of butt ends that are opposed to each other. As illustrated in FIG. 5B, the partition rings 7, 8 may be continuous around the entire circumference without a gap.

As illustrated in FIG. 2, the groove wall forming surface 24 of the top land member 2 and the upper partition wall surface S3 of the partition ring 7 define therebetween a space in which the top ring 4 can be set. The lower partition wall surface S4 of the partition ring 7 and the upper partition wall surface S3 of the partition ring 8 define therebetween a space in which the second ring 5 can be set. The lower partition wall surface S4 of the partition ring 8 and the step surface 14 of the piston 1 define therebetween a space in which the oil control ring 6 can be set. In this way, the partition ring 7 placed between the top ring 4 and the second ring 5 keeps the top ring 4 and the second ring 5 apart. The partition ring 8 placed between the second ring 5 and the oil control ring 6 keeps the second ring 5 and the oil control ring 6 apart. As above, the partition rings 7, 8 are placed between the piston rings 4, 5, 6 to partition the first ring groove 3, thereby allowing the three piston rings 4, 5, 6 to be set in the single first ring groove 3. In this piston unit 20, the partition ring 7 functions as a substitute for the second land, and the partition ring 8 functions as a substitute for the third land.

The material of the partition rings 7, 8 is not limited particularly. For example, partition rings made of a steel, a cast iron, a copper alloy, or aluminum alloy can be used. The surface of the partition rings 7, 8 may have a coating applied thereon that includes at least one of a resin coating layer, a nitrided coating layer, an anodic oxidation coating layer, a plated coating layer, a PVD coating layer, a paint coating layer, and a DLC coating layer. It is preferred that such a coating be applied to the inner circumferential fitting surface S2, the upper partition wall surface S3, and the lower partition wall surface S4, which are the surfaces of the partition rings 7, 8 that are to be in contact with other parts. Applying such a coating can enhance the abrasion resistance of the partition rings 7, 8, thereby preventing problems that might otherwise be caused by direct contact of their base members, such as adhesion of the partition rings 7, 8 and other members.

Process of Assembling the Piston Unit

The piston unit 20 according to the embodiment is assembled in the following manner. Firstly, the piston rings 4, 5, 6 and the partition rings 7, 8 are attached to the piston 1 to which the top land member 2 is not attached. The piston rings 4, 5, 6 and the partition rings 7, 8 are attached to the first portion 1a of the piston 1 in order from the ring farthest from the top surface 11 of the piston 1 (i.e. the oil control ring 6, in the case of this embodiment). Thereafter, the top land member 2 is attached to the first portion 1a of the piston 1 to form the first ring groove 3, resulting in the piston unit 20 assembled as shown in FIG. 1. Examples of the method of attaching the partition rings 7, 8 include, but are not limited to, shrink fitting, friction bonding, using screws, screwing, adhesion, and welding. In the case where friction bonding is used, the partition rings 7, 8 are fitted to the piston 1 and then slid on the piston 1 so that they are bonded to the piston 1.

Operation and Advantageous Effects

As above, the piston unit 20 according to the embodiment has the piston 1, the top land member 2 attached to the piston 1, the first ring groove 3 formed on the outer circumference of the piston 1, the plurality of piston rings 4, 5, 6 that are fitted in the first ring groove 3 to slide on the inner wall surface 101 of the cylinder 10, and the plurality of partition rings 7, 8 that are fitted in the first ring groove 3 side by side with the piston rings 4, 5, 6 along the axial direction of the piston 1. The piston 1 has the first portion 1a that includes its top surface 11 side end and to which the top land member 2 is attached. The outer diameter of the first portion 1a is smaller than the outer diameter of the second portion 1b, which is the other portion of the piston 1 than the first portion 1a, so that there is a step between the first portion 1a and the second portion 1b. The top land member 2 has a groove wall forming surface 24 opposed to the step surface 14 that connects the first outer circumferential surface 12 of the first portion 1a and the second outer circumferential surface 13 of the second portion 1b. The groove wall forming surface 24, the step surface 14, and the first outer circumferential surface 12 define the first ring groove 3 in the piston unit 20.

As above, the piston unit 20 uses the top land member 2 that is separate from the piston 1 and detachably attached to the piston 1 to constitute the top land, which is the portion between the top surface 11 of the piston 1 and the first ring groove 3. Therefore, it is possible to assemble the piston rings 4, 5, 6 and the partition rigs 7, 8 to the piston 1 without the top land member 2 attached thereto. With this construction, in the process of assembly, it is not necessary to expand the piston rings 4, 5, 6 and the partition rings 7, 8 to make their inner diameters larger than the outer diameter of the top land, and therefore it is possible to easily assemble the piston rings 4, 5, 6 and the partition rings 7, 8 to the piston 1 even in the case where they do not have gaps. In other words, this construction allows a piston ring or a partition ring that does not have a gap (which will also be referred to as a gapless ring hereinafter) to easily be assembled to the piston. Moreover, in the case where the piston rings 4, 5, 6 and the partition rings 7, 8 have gaps, the piston unit 20 constructed as above eliminates the need to expand them to make their inner diameters larger than the outer diameter of the top land in the process of assembly, and therefore deformation or breakage of the rings due to excessive expansion of their gaps can be prevented.

As above, the piston unit 20 allows easy assembly of the piston rings 4, 5, 6 and the partition rings 7, 8. Likewise, the piston unit 20 allows easy detachment of the piston rings 4, 5, 6 and the partition rings 7, 8. Therefore, the piston unit 20 allows easy replacement of the piston rings 4, 5, 6 and the partition rings 7, 8, resulting in a longer life of the internal combustion engine 100.

According to the present invention, at least one partition ring among one or more partition rings fitted in the first ring groove may be a gapless ring, or at least one piston ring among one or more piston rings fitted in the first ring groove may be a gapless ring. This can prevent blow-by or oil rising through gaps from occurring. The use of gapless partition rings makes manufacturing of partition rings easier. In consequence, the manufacturing cost can be reduced, and the accuracy of dimension of the partition rings can be increased.

Since the top land of the piston unit 20 is constituted by the top land member 2 separate from the piston 1, the material and the surface processing for the top land can easily be made different from those for the piston 1. Selecting an appropriate material and surface processing for the top land member 2 helps to prevent problems such as aluminum adhesion at the point of contact between the top ring 4 and the top land member 2 and to improve the abrasion resistance and the heat resistance of the top land member 2.

While the piston unit 20 according to the embodiment is provided with only one ring groove (only the first ring groove 3), the piston unit according to the present invention may have a plurality of ring grooves formed on the outer circumference of the piston. What is taught by the present invention is that one or more piston rings are fitted in the first ring groove that is closest to one end surface (the top surface 11 in this embodiment) of the piston among a plurality of ring grooves. Therefore, the number of piston rings fitted in the first ring groove is not limited to three, but it may be two or less, or four or more. For example, two ring grooves may be provided on the outer circumference of the piston, two piston rings (top and second rings) may be fitted in the ring groove (first ring groove) closest to one end surface of the piston together with a partition ring, and one piston ring (oil control ring) may be fitted in the ring groove (second ring groove) second closest to the top surface, as described later in the second modification. The types of piston rings are not limited to the top ring, the second ring, and the oil control ring described above.

When the internal combustion engine uses a plurality of piston rings attached to the piston, in the case where ring grooves are provided for the respective piston rings on a ring-by-ring basis, it is necessary to make the distances between the ring grooves short in order to make the axial length of the piston shorter. However, making the distances between the ring grooves shorter results in shorter widths of the piston lands between adjacent ring grooves, and therefore it is difficult to keep the strength of the piston. In terms of the accuracy of finishing the ring grooves, it is difficult to make the axial length of the piston shorter. In contrast, in the case of the piston unit 20 according to the embodiment, the partition rings 7, 8 that are fitted to the first outer circumferential surface 12 of the first portion 1a with a predetermined spacing to the inner wall surface 101 of the cylinder 10 function as substitutes for the piston lands that separate the piston rings 4, 5, 6 in the first ring groove 3. Therefore, it is not necessary to provide ring grooves in which the piston rings 4, 5, 6 are fitted on a ring-by-ring basis on the piston 1. In other words, the piston unit 20 according to the embodiment allows a plurality of piston rings (the piston rings 4, 5, 6 in this embodiment) to be fitted in one ring groove (the first ring groove 3). Therefore, when the internal combustion engine uses a plurality of piston rings attached to the piston, it is possible to make the number of ring grooves smaller than in the case where ring grooves are formed for the respective piston rings on a ring-by-ring basis. This makes it easy to make the axial length of the piston 1 shorter. In consequence, the piston unit 20 is advantageous in reducing the weight of the piston and the weight of the internal combustion engine. The piston unit 20 also makes it possible to reduce the axial length of the piston 1 by reducing the widths of the piston rings and the partition rings. Since the number of ring grooves to be formed on the piston 1 is reduced, it is possible to enhance the strength of the piston, as compared to the case where ring grooves are formed for the respective piston rings on a ring-by-ring basis. This makes it possible to increase the power of the internal combustion engine.

The piston unit 20 provided with the partition rings 7, 8 can reduce design constraints on the land volume. Here, the term "land volume" refers to the volume of a space (land space) enclosed by axially adjacent piston rings, the outer circumferential surface of the piston, and the inner wall surface of the cylinder. In this embodiment, since the partition rings 7, 8 serve as substitutes for piston lands, the space enclosed by the bottom surface 44 of the top ring 4, the top surface 53 of the second ring 5, the outer circumferential spacing surface S1 of the partition ring 7, and the inner wall surface 101 of the cylinder 10 constitutes the second land space, and the space enclosed by the bottom surface 54 of the second ring 5, the top surface 613 of the upper segment 61U of the oil control ring 6, the outer circumferential spacing surface S1 of the partition ring 8, and the inner wall surface 101 of the cylinder 10 constitutes the third land space. Since the partition rings 7, 8 are members that are separate from the piston 1, constraints on the reduction of the axial width of the partition rings 7, 8 in terms of strength are smaller than those for the piston lands. Therefore, the piston unit 20 can enjoy a higher degree of design freedom in terms of land volume. In consequence, it is possible to increase the degree of design freedom in terms of the function of pressure adjustment and the function as an oil reservoir to be exercised by the land space.

The piston is typically made of an aluminum alloy, and there is a possibility that aluminum adhesion occurs at the point of contact between the piston ring and the piston. There also is a possibility that the piston wears with sliding between the piston and the piston ring. Since the piston unit 20 uses the partition ring 7 placed between the top ring 4 and the second ring 5 in place of the second land and the partition ring 8 placed between the second ring 5 and the oil control ring 6 in place of the third land, the number of points of contacts between the piston rings 4, 5, 6 and the piston 1 can be made smaller than in the case where the piston rings are separated by the piston lands. Therefore, it is possible to reduce problems such as aluminum adhesion that can be caused by direct contact of the piston rings 4, 5, 6 and the partition rings 7, 8. It is also possible to prevent problems such as aluminum adhesion at the points of contact between the piston rings 4, 5, 6 and the partition rings 7, 8 and to improve the abrasion resistance and the heat resistance of the partition rings 7, 8 by selecting an appropriate material and surface processing for the partition rings 7, 8.

Since the piston unit 20 is designed in such a way that the first outer circumferential surface 12 of the piston 1 and the inner circumferential fitting surface S2 of the partition rings 7, 8 are kept in contact with each other, oil rising and gas leakage through the inner circumference of the partition rings 7, 8 in the first ring groove 3 can be prevented. Since the first outer circumferential surface 12 of the piston 1 and the inner circumferential fitting surface S2 of the partition rings 7, 8 are kept in contact with each other, the heat of the piston 1 is transferred from the first outer circumferential surface 12 to the piston rings 4, 5, 6 through the inner circumferential fitting surface S2 of the partition rings 7, 8, and then dissipated to the cylinder 10, with which the piston rings 4, 5, 6 are in sliding contact. To achieve cooling of the piston 1, it is sufficient that at least a portion of the inner circumferential fitting surface S2 is in contact with the first outer circumferential surface 12 of the piston 1.

While a plurality of partition rings (two partition rings 7, 8) is fitted in the first ring groove 3 according to the embodiment, the number of partition rings fitted in the first ring groove is not limited to two, but it may be one, or three or more. In other words, one or more partition rings may be fitted in the first ring groove. For example, two piston rings (top and second rings) and one partition ring may be fitted in the first ring groove, and the partition ring may be disposed between the two piston rings as described later in the description of the second modification. For further example, one piston ring (top ring) and one partition ring may be fitted in the first ring groove, and the partition ring may be disposed between the bottom surface of the piston ring and the step surface of the piston (the lower inner wall of the ring groove). This design also can reduce the number of points of contact between the piston rings and the piston. The partition ring is not an essential part of the piston unit according to the present invention. The piston unit according to the present invention may not have a partition ring, as described later in the description of a third modification.

Modifications

In the following, modifications of the embodiment will be described. The following description is mainly directed to features that are different from the features of the piston unit 20 described above. Similar features are denoted by the same reference signs and not described in further detail.

First Modification

FIG. 6 is a partial cross sectional view of an internal combustion engine 100A provided with a piston unit 20A according to the first modification of the embodiment. The piston unit 20A according to the first modification 1 is different from the piston unit 20 described above in the shape of the partition rings.

As illustrated in FIG. 6, a partition ring 7A according to the first modification has a T-shape in the cross section perpendicular to the circumferential direction. The partition ring 7A has an outer circumferential spacing surface S1, an inner circumferential fitting surface S2, an upper partition wall surface S3, a lower partition wall surface S4, an upper protruding portion UP1 and a lower protruding portion LP1. A partition ring 8A according to the first modification has an L-shape in the cross section perpendicular to the circumferential direction. The partition ring 8A has an outer circumferential spacing surface S1, an inner circumferential fitting surface S2, an upper partition wall surface S3, a lower partition wall surface S4, and a lower protruding portion LP1. The upper protruding portion UP1 is provided on the inside of the upper partition wall surface S3 with respect to the radial direction of the piston 1 and protrudes upward (toward the combustion chamber 30) above the upper partition wall surface S3. The lower protruding portion LP1 is provided on the inside of the lower partition wall surface S4 with respect to the radial direction of the piston 1 and protrudes downward (toward the crankcase 40) below the lower partition wall surface S4.

The upper protruding portion UP1 of the partition ring 7A abuts the groove wall forming surface 24 of the top land member 2 on the side of the inner circumferential surface 42 of the top ring 4 to restrict upward movement of the partition ring 7A. The lower protruding portion LP1 of the partition ring 7A abuts the upper partition wall surface S3 of the partition ring 8A on the side of the inner circumferential surface 52 of the second ring 5 to restrict downward movement of the partition ring 7A and upward movement of the partition ring 8A. The lower protruding portion LP1 of the partition ring 8A abuts the step surface 14 of the piston 1 on the side of the inner circumferential surface of the oil control ring 6 to restrict downward movement of the partition ring 8A. In this way, the partition rings 7A, 8A are held along the axial direction of the piston 1, whereby axial movement of them is restricted.

In the piston unit 20A according to the first modification, axial movement of the partition rings 7A, 8A is restricted by the upper protruding portion UP1 and the lower protruding portions LP2, by which side clearances of the piston rings 4, 5, 6 can be left. The side clearance refers to a clearance formed between a piston ring and another member (top land member, partition ring, or piston) that is adjacent to the piston ring along the axial direction of the piston.

Second Modification

FIG. 7 is a partial cross sectional view of an internal combustion engine 100B provided with a piston unit 20B according to the second modification of the embodiment. The piston unit 20B according to the second modification has a second ring groove 102 formed on the second outer circumferential surface 13 of the piston 1. In other words, the piston unit 20B has a plurality of (two) ring grooves formed on the outer circumference of the piston 1. The top ring 4, the second ring 5, and the partition ring 7 are fitted in the first ring groove 3, and the partition ring 7 is disposed between the top ring 4 and the second ring 5. The oil control ring 6 is fitted in the second ring groove 102.

Third Modification

Figure 8:
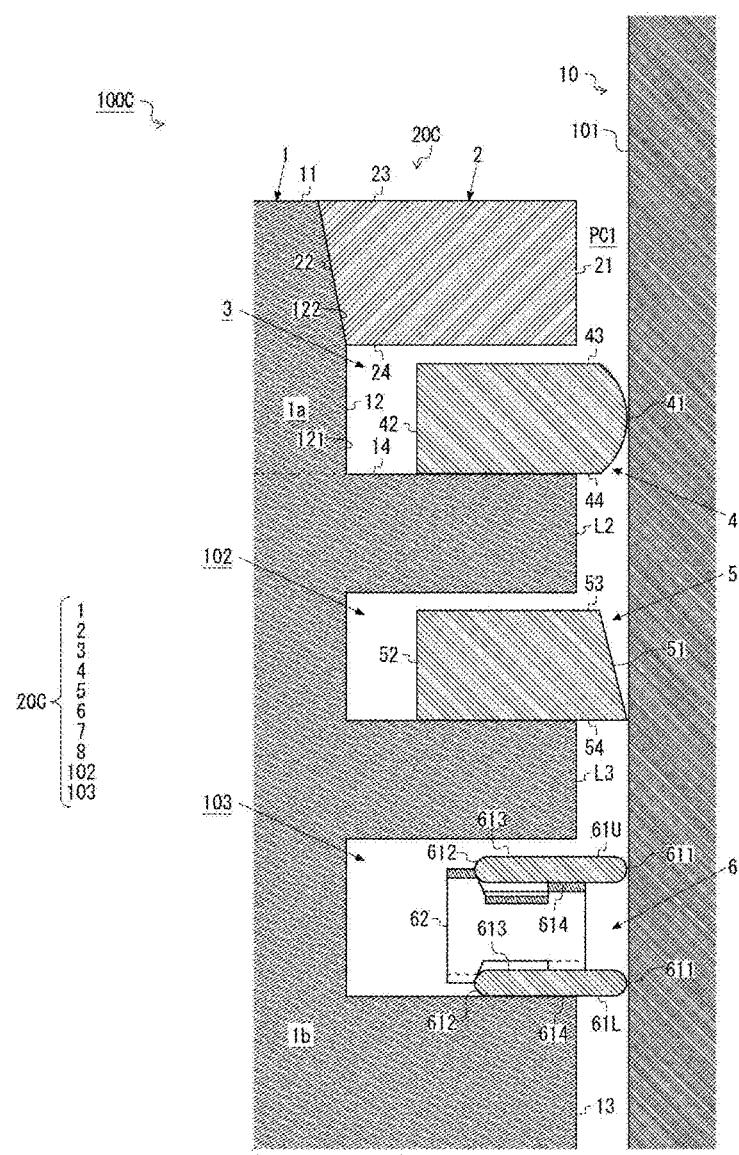
FIG. 8 is a partial cross sectional view illustrating an internal combustion engine including a piston unit according to a third modification of the embodiment.

FIG. 8 is a partial cross sectional view of an internal combustion engine 100C provided with a piston unit 20C according to the third modification of the embodiment. The piston unit 20C according to the third modification is not provided with a partition ring. The piston unit 20C according to the third modification has a second ring groove 102 and a third ring groove 103 that are formed on the second outer circumferential surface 13 of the piston 3 and arranged in order away from the top surface 11 of the piston 1. In other words, the piston unit 20C has a plurality of (three) ring grooves formed on the outer circumference of the piston 1. The top ring 4 is fitted in the first ring groove 3, the second ring 5 is fitted in the second ring groove 102, and the oil control ring 6 is fitted in the third ring groove 103.

Fourth Modification

Figure 9:
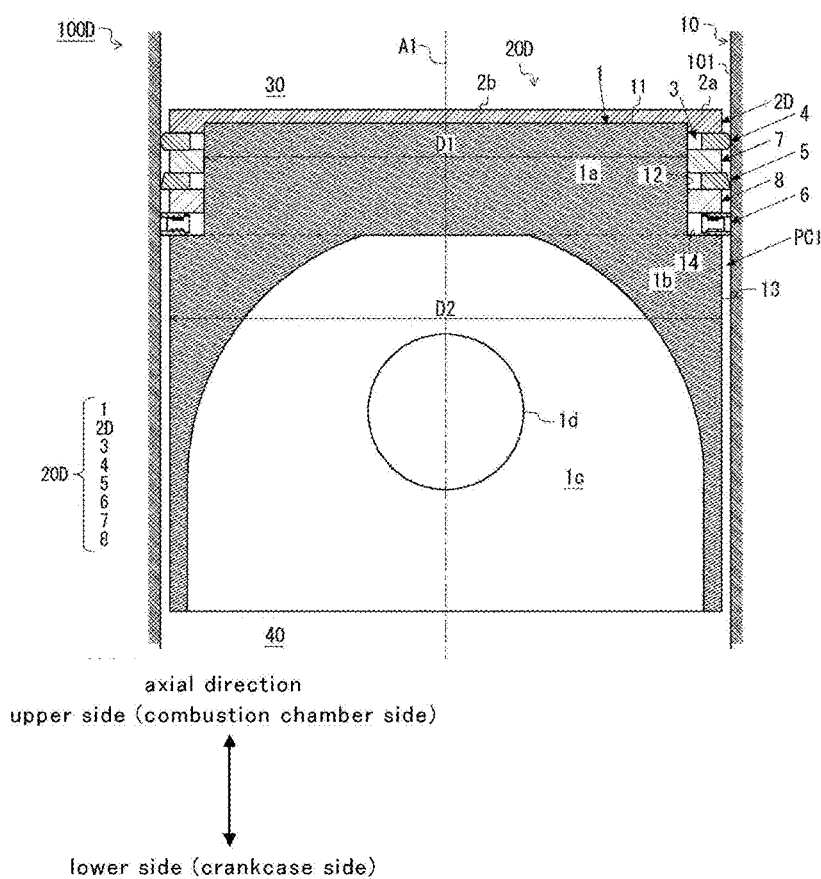
FIG. 9 is a cross sectional view illustrating an internal combustion engine including a piston unit according to a fourth modification of the embodiment.
Figure 10:
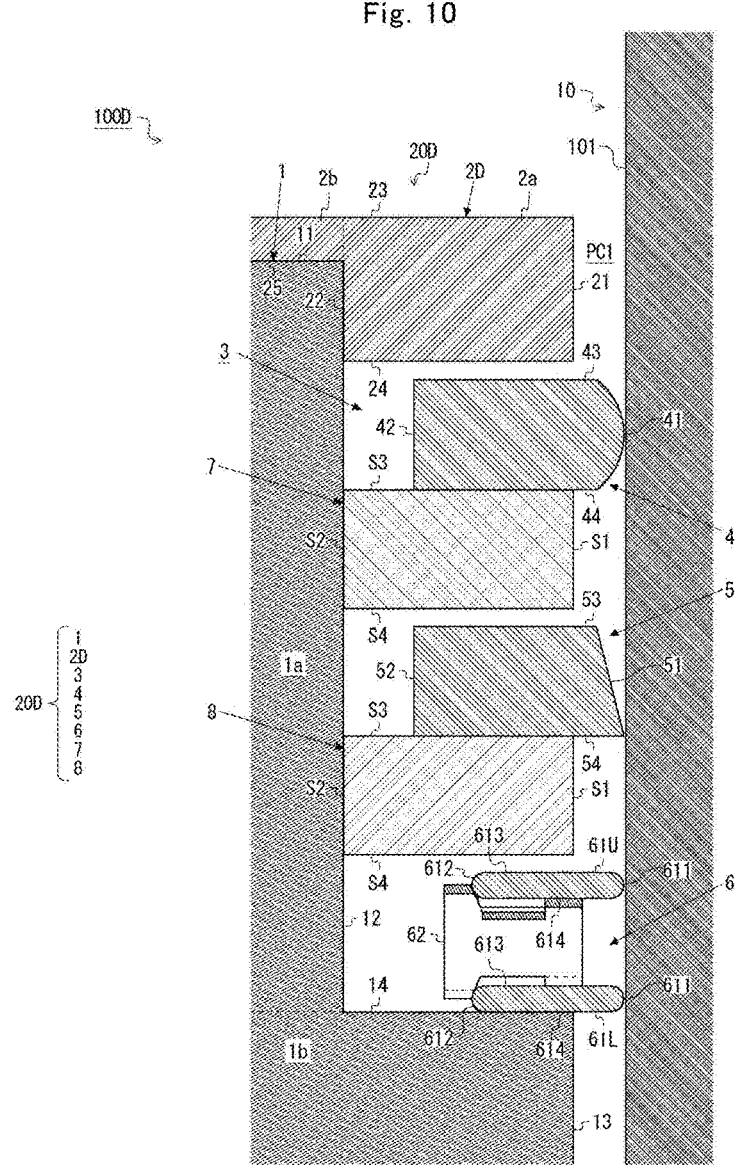
FIG. 10 is a partial cross sectional view illustrating the internal combustion engine including the piston unit according to the fourth modification of the embodiment.

FIG. 9 is a cross sectional view of an internal combustion engine 100D provided with a piston unit 20D according to the fourth modification of the embodiment. FIG. 10 is a partial cross sectional view of the internal combustion engine 100D provided with the piston unit 20D according to the fourth modification of the embodiment. As illustrated in FIG. 9, the piston unit 20D according to the fourth modification is different from the piston unit 20 described above in that the top land member is shaped like a cap.

As illustrated in FIGS. 9 and 10, a top land member 2D according to the fourth modification has an annular portion 2a and a lid portion 2b. As illustrated in FIG. 10, the annular portion 2a is an annular portion that has an inner circumferential surface that constitutes an annular piston-fit surface 22 fitted to the first outer circumferential surface 12 of the first portion 1a of the piston 1. According to the fourth modification, the groove wall forming surface 24 is constituted by the bottom end surface of the annular portion 2a. According to the fourth modification, the land outer circumferential surface 21 is constituted by the outer circumferential surface of the annular portion 2a. The lid portion 2b is provided inside the annular portion 2a. The lid portion 2b fills the inside space of the annular portion 2a except for a certain region including its lower end. Thus, a piston-fit surface 22 is provided inside the annular portion 2a. According to the fourth modification, the land end surface 23 includes the top end surface of the annular portion 2a and the top end surface of the lid portion 2b. According to the fourth modification, the land end surface 23 of the top land member 2D constitutes the top surface (top end surface) of the piston unit 20D.

As illustrated in FIG. 10, the lid portion 2b of the top land member 2D covers the top surface 11 of the piston 1. The lid portion 2b abuts the top surface 11 of the piston 1, so that the top land member 2D is supported by the top surface 11 from below. This restricts the movement of the top land member 2D in the direction away from the top surface 11 (i.e. downward direction), so that a predetermined spacing between the groove wall forming surface 24 and the step surface 14 is kept.

Figure 11A:
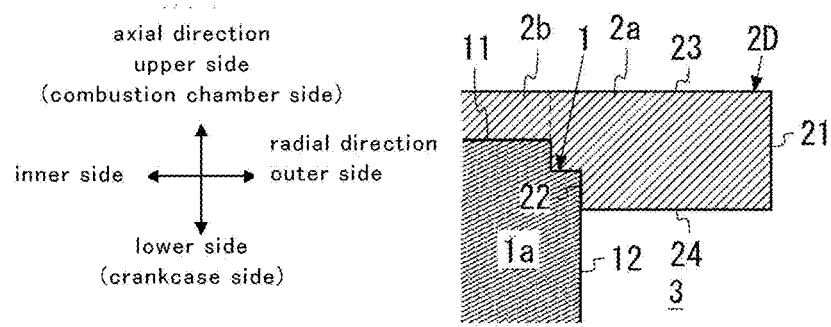
FIGS. 11A-11C are diagrams for illustrating variations of the mode of fitting between the top land member and the piston.
Figure 11B:
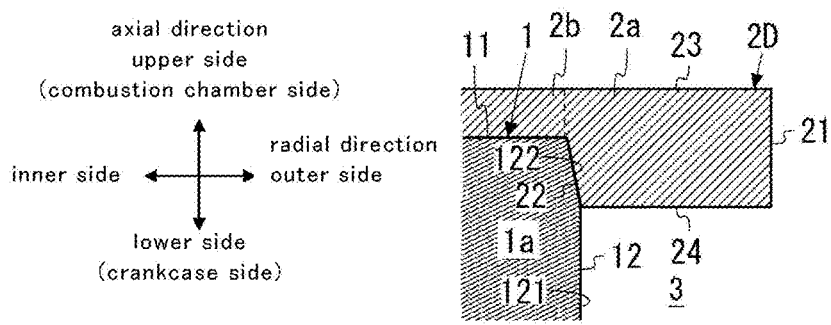
Figure 11C:
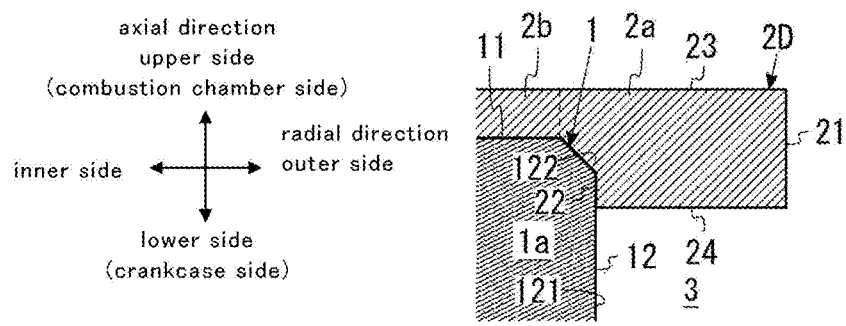

FIGS. 11A-11C are diagrams for illustrating variations of the mode of fitting of the top land member 2D and the piston 1. As illustrated in FIG. 11A, the first portion 1a may be provided with a radial step, to which the piston-fit surface 22 may be fitted. As illustrated in FIG. 11B, the piston-fit surface 22 of the top land member 2D may be slanted (or beveled) in its entirety so that it fits the tapered surface 122. As illustrated in FIG. 11C, the piston-fit surface 22 may be partly slanted (or beveled) so that a portion thereof fits the constant diameter surface 121 and the other portion thereof fits the tapered surface 122.

Others

While preferred modes of the present invention have been described in the foregoing, the various modes described above can be adopted in any feasible combination.

REFERENCE SIGNS LIST 100, 100A, 100B, 100C, 100D: internal combustion engine
10: cylinder
20, 20A, 20B, 20C, 20D: piston unit
30: combustion chamber
40: crankcase
1: piston
2, 2D: top land member
3: first ring groove
4, 5, 6: piston ring
7, 7A, 8, 8A: partition ring

The invention claimed is:

1. A piston unit adapted to reciprocate in a cylinder, comprising:
   a piston;
   a top land member attached to the piston;
   one or more ring grooves formed on an outer circumference of the piston; and
   one or more piston rings fitted in a first ring groove closest to one end surface of the piston among the one or more ring grooves to slide on an inner wall surface of the cylinder,
   wherein the piston includes a first portion including a piston end at a one end surface side and fitted with the top land member, the first portion having a smaller outer diameter than a second portion such that there is a step therebetween, the second portion being the other portion of the piston than the first portion,
   the top land member has a slanted piston-fit surface that attaches horizontally side-by-side to an equal length tapered surface of the first portion,
      the first ring groove is defined by the groove wall forming surface, the step surface, and the outer circumferential surface of the first portion,
      the top land member is formed as a ring that has an annular piston-fit surface fitted to the outer circumferential surface of the first portion as an inner circumferential surface, and
      wherein the piston-fit surface is slanted to have its diameter decrease as it extends upwards and the diameter of the tapered surface decreases in the same direction and fits to the outer circumferential surface of the first portion in such a way that the top land member is supported by the outer circumferential surface of the first portion from the other end surface of the piston side.

2. A piston unit according to claim 1, further comprising one or more partition rings fitted in the first ring groove side by side with the one or more piston rings along the axial direction of the piston, wherein
 the one or more partition rings are fitted to the outer circumferential surface of the first portion with a predetermined spacing to the inner wall of the cylinder.

3. A piston unit according to claim 2, wherein at least one partition ring among the one or more partition rings has no gap.

4. A piston unit according to claim 2, wherein
 a plurality of piston rings is fitted in the first ring groove, and
 the partition ring is disposed between the piston ring closest to the one end surface of the piston and the piston ring second closest to the one end surface of the piston among the plurality of piston rings.

5. A piston unit according to claim 1 mounted in a cylinder of an internal combustion engine.

6. A top land member attached to a piston adapted to reciprocate in a cylinder, wherein
 the piston has one or more ring grooves formed on its outer circumference,
 the piston includes a first portion including a piston end at one end surface side and fitted with the top land member, the first portion having a smaller outer diameter than a second portion such that there is a step therebetween, the second portion being the other portion of the piston than the first portion,
 the first ring groove that is closest to the one end surface among the one or more ring grooves is fitted with one or more piston rings adapted to slide on an inner wall surface of the cylinder,
 the top land member has a slanted piston-fit surface that attaches horizontally side-by-side to an equal length tapered surface of the first portion,
  the first ring groove is defined by the groove wall forming surface, the step surface, and the outer circumferential surface of the first portion,
  the top land member is formed as a ring that has an annular piston-fit surface fitted to the outer circumferential surface of the first portion as an inner circumferential surface, and
 wherein the piston-fit surface is slanted to have its diameter decrease as it extends upwards and the diameter of the tapered surface decreases in the same direction and fits to the outer circumferential surface of the first portion in such a way that the top land member is supported by the outer circumferential surface of the first portion from the other end surface of the piston side.

7. A combination of piston unit parts, comprising:
 a top land member attached to a piston adapted to reciprocate in a cylinder; and
 one or more piston rings adapted to slide on an inner wall surface of the cylinder, the one or more piston rings being fitted in a first ring groove located closest to one end surface of the piston among one or more ring grooves formed on an outer circumference of the piston,
wherein the piston includes a first portion including a piston end at a one end surface side and fitted with the top land member, the first portion having a smaller outer diameter than a second portion such that there is a step therebetween, the second portion being the other portion of the piston than the first portion,
the top land member has a slanted piston-fit surface that attaches horizontally side-by-side to an equal length tapered surface of the first portion,
 the first ring groove is defined by the groove wall forming surface, the step surface, and the outer circumferential surface of the first portion,
 the top land member is formed as a ring that has an annular piston-fit surface fitted to the outer circumferential surface of the first portion as an inner circumferential surface, and
 wherein the piston-fit surface is slanted to have its diameter decrease as it extends upwards and the diameter of the tapered surface decreases in the same direction and fits to the outer circumferential surface of the first portion in such a way that the top land member is supported by the outer circumferential surface of the first portion from the other end surface of the piston side.

* * * * *